US012785273B2

(12) United States Patent
Ricart-Fernández et al.

(10) Patent No.: US 12,785,273 B2
(45) Date of Patent: Nov. 3, 2026

(54) YAGI-TYPE MULTIBAND ANTENNA

(71) Applicant: TELEVES, S.A.U., Santiago de Compostela (ES)

(72) Inventors: Jesus Ricart-Fernández, Santiago de Compostela (ES); Alba-Maria Gallarado Fernandez, Santiago de Compostela (ES); Javier Pazos-Losada, Santiago de Compostela (ES)

(73) Assignee: Televes S.A.U., Santiago de Compostela (ES)

( * ) Notice: Subject to any disclaimer, the term of this patent is extended or adjusted under 35 U.S.C. 154(b) by 165 days.

(21) Appl. No.: 18/746,215

(22) Filed: Jun. 18, 2024

(65) Prior Publication Data

US 2024/0421480 A1 Dec. 19, 2024

(30) Foreign Application Priority Data

Jun. 19, 2023 (ES) .................................. 202330508

(51) Int. Cl.
*H01Q 9/16* (2006.01)
*H01Q 5/392* (2015.01)
(Continued)

(52) U.S. Cl.
CPC ............... *H01Q 5/392* (2015.01); *H01Q 9/16* (2013.01); *H01Q 15/14* (2013.01)

(58) Field of Classification Search
CPC ........ H01Q 15/14; H01Q 19/12; H01Q 19/30; H01Q 5/39; H01Q 5/392; H01Q 9/16; H01Q 21/12
See application file for complete search history.

(56) References Cited

U.S. PATENT DOCUMENTS 4,028,709 A * 6/1977 Berkowitz ........... H01Q 1/1228 343/894
7,286,097 B1 * 10/2007 Van Buren ............ H01Q 19/30 343/810
(Continued)

FOREIGN PATENT DOCUMENTS

DE 202005003233 U1 7/2005
EP 2093838 A1 * 8/2009 ............ H01Q 19/30
(Continued)

*Primary Examiner* — Tho G Phan
(74) *Attorney, Agent, or Firm* — Ipsilon USA-NLO

(57) ABSTRACT

The invention relates to a Yagi-type multiband antenna comprising a dipole 1 connected to an input/output cable, a plurality of n director bars 2 (n>=2), each of them designed for a frequency band and fastening and supporting means 3 to which the director bars 2 are attached at one of their ends. The dipole 1 is designed for a bandwidth that includes all working bands of the antenna, so that it allows multiband reception. For their part, the director bars 2 meet each other at distances $d_1, d_2, \ldots, d_{n-1}$ this distance measured in the supporting element(s), and form angles $\alpha_1, \alpha_2, \ldots, \alpha_{n-1}$ with each other. This antenna is characterized in that at least two director bars 2 are designed for different frequency bands.

10 Claims, 6 Drawing Sheets

(51) Int. Cl.
*H01Q 15/14* (2006.01)
*H01Q 19/30* (2006.01)
*H01Q 21/12* (2006.01)

(56) References Cited

U.S. PATENT DOCUMENTS 7,911,406 B2 * 3/2011 Eckwielen ............. H01Q 19/04 343/833
8,144,070 B2 * 3/2012 Wright ..................... H01Q 1/08 343/815
8,558,748 B2 * 10/2013 Chen ........................ H01Q 5/49 343/822
8,674,895 B2 * 3/2014 Timofeev ............... H01Q 21/08 343/793

FOREIGN PATENT DOCUMENTS

JP 2005210348 A 8/2005
JP 2009005245 A 1/2009
KR 100507033 B1 8/2005

* cited by examiner

YAGI-TYPE MULTIBAND ANTENNA

TECHNICAL SECTOR

The present invention relates to a multiband antenna for receiving and/or transmitting radio frequency signals, according to claim number 1.

BACKGROUND OF THE INVENTION

Today there are many communications services that are transmitted over the air (Television, Mobile Telephony, Wi-Fi). Given the increased demand for capacity of these services, they are increasingly occupying frequency bands (for example, 2.4 and 5 GHz Wi-Fi, 700 MHz and 3.4 GHz 5G, VHF and UHF TV . . . ). In addition, there is the additional problem that these frequency bands can vary between countries (for instance, GSM, 5G or DTT in Europe and the USA).

The skilled person will understand that the concept of multiband, as used throughout the description, refers to different frequency ranges, so they do not overlap each other, such as the examples indicated above.

This requires either the use of several antennas covering each frequency band or an antenna covering several frequency bands simultaneously (multiband antennas or wideband antennas). The first option is usually used in base stations where sufficient space is available and is suitable to avoid intermodulations between the different frequency bands when handling high powers in those base stations. However, it is not the most appropriate option for the consumer/end user, due to its large size and volume.

In order to achieve this aim, the use of multiband, wideband or ultrawideband antennas has been proposed. There are many multiband solutions (examples), one of the most commonly used is the so-called log-periodic antenna (LPDA), which allows bandwidths of several frequency octaves. However, this type of antenna usually has a medium gain (maximum 9-10 dBi) that may be insufficient for long-range applications, and it is also a broadband antenna that receives all the signals in its frequency range, which may be counterproductive if you want to eliminate the intermediate frequency bands to avoid interferences.

Another type of antenna widely used is called Yagi-Uda, as shown in FIG. 1, which consists of a dipole 1 for signal collection and one or more longitudinal bars 2 containing director elements 21 of certain lengths and separated from each other by a distance that depends on the desired working band for the antenna, so that they increase the directivity of the antenna in certain directions.

The dipole or radiating element 1 is the element that collects or transmits the signal, and its design responds to a structure adapted to the frequency band in which it is desired that the antenna operates.

The directors 21, on the other hand, are elements located in the front area of the dipole that reinforce the field in said front area, increasing the directivity of the antenna. These directors 21 are located along one or more director bars 2, and the length thereof as well as the distance between one and the next is determined by the working band of the antenna. Therefore, the director bars 2 are specifically designed for the operating frequency band of the antenna. More specifically, and although there is no exact formula, the theory states that the length L of the directors must be set between 0.4 and 0.49 times the working wavelength $\lambda$ and the spacing between them within the director bar must be between 0.1 and 0.5 times the working wavelength $\lambda$. It is also possible to use director bars in which the lengths of the different directors ($L_1$, $L_2$, . . . $L_n$) and/or the distance between different directors ($s_1$, $s_2$, . . . $s_n$) are different to adapt the frequency response of the antenna to a certain band.

FIG. 2 shows two examples of director bars designed for different frequency bands, specific for 4G and for 5G. In these examples, in each of the bars the distances between different directors ($s_1$, $s_2$, . . . , $s_n$) are equal $s_1=s_2=\ldots=s_n$ and the lengths of the directors are also equal $L_1=L_2=\ldots=L_n=L$, if they could both also be different as long as the relationship between said distances (lengths) and the working wavelength $\lambda$ is within the ranges indicated above.

On certain occasions, these antennas also have reflector elements 4 located behind the dipole to reduce the level of the signal received at the back of the antenna and, at the same time, reinforce the signal received by the front of the antenna thus increasing directivity. Said reflectors 4 must also be designed specifically for the working frequency of the antenna, by defining their size and their distance to the dipole, as is also well known in the state of the art. FIG. 3 shows an example of an antenna with reflector elements 4.

While these types of antennas provide higher gains (up to 18 dBi) and better directivities (narrower beam-width), they are generally narrowband antennas (a low % around the center frequency), further degrading their characteristics with increasing bandwidth. This is why they are not usually used for multiband applications, understanding multiband as a group of frequency bands with bandwidths not overlapping each other, such as Wi-Fi at 2.4 GHz and 5 GHz.

However, numerous efforts have been made to increase the bandwidth of Yagi-type antennas to allow them to be used in multiband applications.

U.S. Pat. No. 8,144,070 describes an antenna structure and directors for modifying the working frequency of the antenna. However, this configuration is limited to a single frequency band, not allowing transmission/reception in several bands simultaneously.

Another solution is described in document KR507033B1, which proposes to introduce a coupling capacity in the dipole to increase the bandwidth of the latter. However, this only produces an increase in bandwidth around the working frequency of said antenna but does not allow its use in new frequency bands separated from each other.

Document DE202005003233U1 discloses a system for combining three Yagi antennas of different frequencies into a single antenna. However, it has the limitation that, due to the coupling effects between the directors and reflectors of the different frequency bands, these can only be placed in very specific places, which limits the possibilities of this architecture both in gains obtained and in frequency bands that can be mixed.

JP 2005 210348 proposes a solution based on separating the directors of the different frequencies in the vertical plane using insulators. However, again, the coupling effect between them limits the number of directors of the lower frequency bands to one or two, while those of the higher frequency exceed a number of ten, this causes an antenna with very unbalanced gains between the lower bands (low gain) and the upper ones (high gain). Although this is partly compensated by the propagation losses, this is not enough if the frequency bands are similar.

All these drawbacks are solved by a Yagi-type multiband antenna according to claim 1.

EXPLANATION OF THE INVENTION

The object of the present invention is a Yagi-type antenna configurable for multiband transmission or reception. This is achieved with an antenna according to claim 1.

In an example according to the invention, as shown in FIG. 1, the Yagi-type multiband antenna comprises a dipole 1 connected to an input/output cable, a plurality of n director bars 2 (n>=2), each of them designed for a frequency band and fastening and supporting means 3 to which the director bars 2 are attached at one of their ends. The dipole 1 is designed for a bandwidth that includes all working bands of the antenna, so that it allows multiband reception. For their part, the director bars 2 meet each other at distances $d_1$, $d_2$, . . . , $d_{n-1}$ this distance measured in the supporting element(s), and form angles $\alpha_1$, $\alpha_2$, . . . , $\alpha_{n-1}$ with each other. This antenna is characterized in that at least two director bars 2 are designed for different frequency bands.

This example has the advantage that the working band of the antenna can be multiple depending on the different frequency bands for which the director bars 2 are designed, thus avoiding the need to use multiple antennas.

In another example according to the invention, the Yagi-type multiband antenna is characterized in that it comprises insertion/extraction means 6 for at least one of the director bars 2.

This example has the advantage that it allows changing the configuration of the antenna for different frequency bands according to the application for which it is intended simply by changing one or more director bars 2 without the need to disassemble the entire structure of the antenna.

In another example according to the invention, the Yagi-type multiband antenna is characterized in that the insertion and extraction means 6 for at least one director bar 2 are integrated with the fastening and supporting means 3.

This example has the advantage that it allows the insertion and extraction means 6 and the fastening and supporting means 3 to be made in a single element, all implemented in the same mechanism without needing to design and manufacture two separate elements.

In another example according to the invention, the Yagi-type multiband antenna is characterized in that it comprises a connection box 5 for connecting the dipole 1 with the output cable in which the insertion and extraction means and/or the fastening and supporting means 3 are integrated.

This example has the advantage that it uses the structure of the antenna connection box 5 to incorporate therein the insertion and extraction means and/or the fastening and supporting means of the director bars 2, removing the need for additional external elements.

In another example according to the invention, the Yagi-type multiband antenna is characterized in that it comprises at least one reflector element 4 adapted to one of the frequency bands.

This example has the advantage that it allows to increase the gain/directivity of the antenna in a given frequency band.

In another example according to the invention, the Yagi-type multiband antenna is characterized in that it comprises two reflectors 4 adapted to different frequency bands.

This example has the advantage of allowing the gain/directivity to be adjusted for each of the frequencies to which the different directors are adapted.

In another example according to the invention, the Yagi-type multiband antenna is characterised in that at least one of the fastening and supporting elements 3 is attached to a reflector 4.

This example has the advantage that it allows the reflectors 4 to be used as fastening and supporting elements 3 of the director bars 2.

In another example according to the invention, the Yagi-type multiband antenna is characterized in that it comprises means for configuring the distance between the director bars $d_1$, $d_2$, . . . , $d_{n-1}$ and/or the angle $\alpha_1$, $\alpha_2$, . . . , $\alpha_{n-1}$ between the director bars.

This example has the advantage of allowing the variation of the frequency response of the antenna by increasing or decreasing the distances $d_1$, $d_2$, . . . , $d_{n-1}$ between director bars, as well as the angles $\alpha_1$, $\alpha_2$, . . . , $\alpha_{n-1}$ that they form between them.

In another example according to the invention, the Yagi-type multiband antenna is characterized in that it comprises at least three director bars 2, where at least two of them are designed for the same frequency band.

This example has the advantage that it allows to improve the gain in one or more determined frequency bands with respect to the others, making it possible to configure the characteristics of the antenna depending on the application for which it is intended.

In another example according to the invention, the Yagi-type multiband antenna is characterized in that it includes a filter connected between the dipole and the output cable.

This example has the advantage that it allows to configure the spectrum to eliminate possible unwanted receptions in frequency bands located between the different bands for which the antenna is configured.

BRIEF DESCRIPTION OF THE DRAWINGS

To complement the description being made herein, and for the purpose of aiding in a better understanding of the characteristics of the invention, a set of drawings is attached as an integral part of said description wherein, by way of illustration and not limitation, the following has been represented.

LIST OF REFERENCES

1 Dipole

2 Director bars

21 Director elements
3 Fastening and supporting means
4 Reflector elements
5 Antenna connection box
6 Director bar insertion/extraction means
$s_1, s_2, \ldots, s_n$ Distances between director elements in a director bar
$L_1, L_2 \ldots, L_n$ Lengths of director elements in a director bar
$d_1, d_2, \ldots, d_{n-1}$ Distances between director bars (n>=2)
$\alpha_1, \alpha_2, \ldots, \alpha_{n-1}$ Angles between director bars (n>=2)

PREFERRED EMBODIMENT OF THE INVENTION

Figure 1:
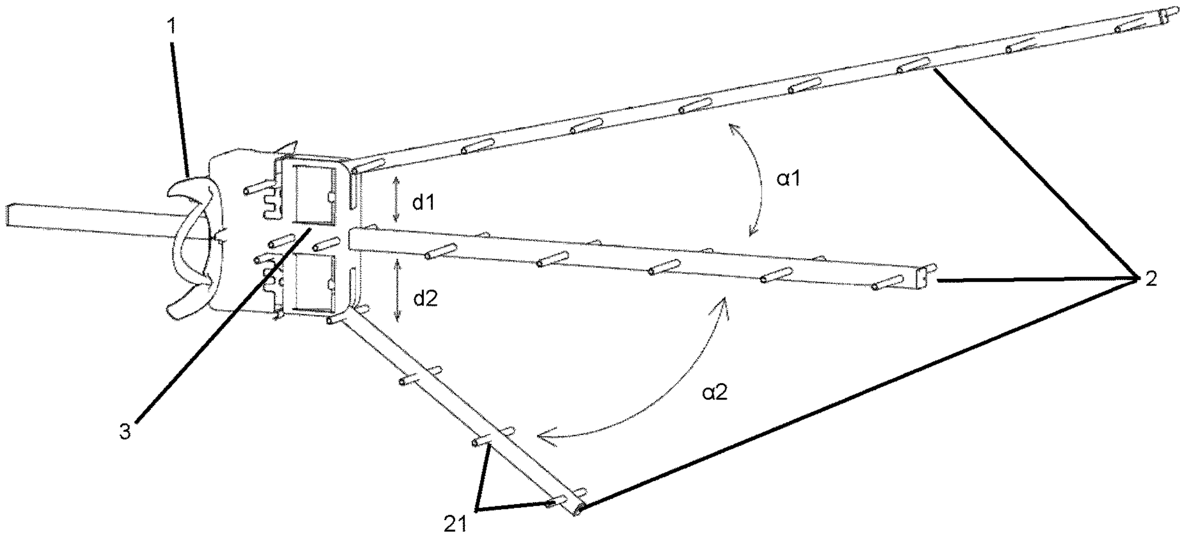
FIG. 1.—Yagi-type antenna with three director bars
Figures 2A, 2B:
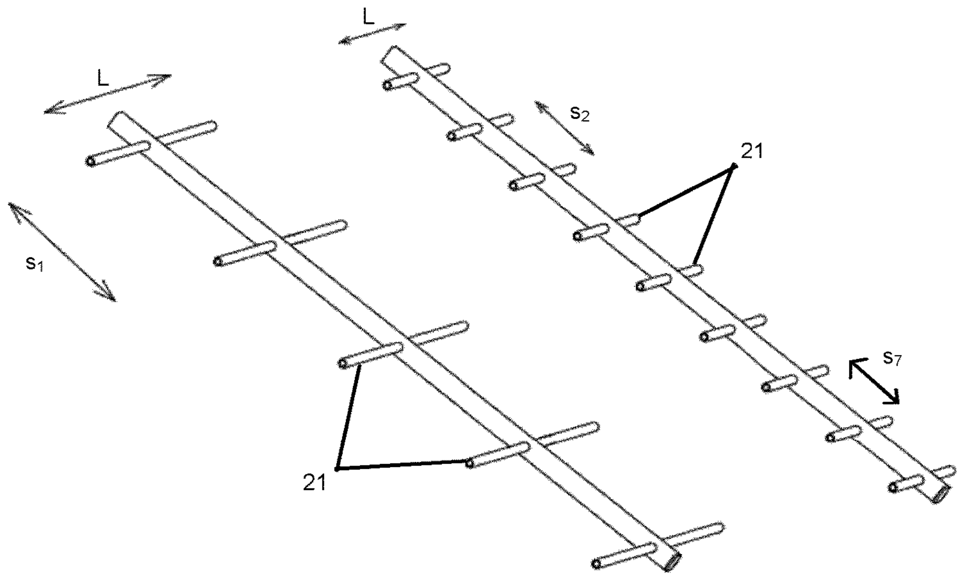
FIG. 2*a*—Director bar for 4G
FIG. 2*b*.—Director bar for 5G

Hereunder, and by way of non-limiting example, a preferred embodiment of the invention is shown. FIG. 1 portrays an image of a preferred embodiment of the antenna. The examples are based on an antenna with three director bars, although any person skilled in the art will understand that analogous examples of the invention can be carried out with any number of bars equal to or greater than two, thus defining for an n number of bars the distances between them $d_1, d_2, \ldots, d_{n-1}$ and the angles between them $\alpha_1, \alpha_2, \ldots, \alpha_{n-1}$ FIG. 3 portrays a preferred embodiment of the invention.

In this embodiment, the antenna comprises a dipole 1 with a bandwidth for the reception/transmission of 5G signals in the n28 (700 MHz) and n78 (3,500 MHz) bands and for 4G signals in the b7 band (2,600 MHz), thus being a broadband dipole that allows reception in that frequency range. In other words, the dipole 2 allows reception of signals between 700 MHz and 3,500 GHz.

In this case, the antenna comprises three director bars 2, adapted to the frequency bands of 700 MHz, 3,500 MHz and 2,600 MHz respectively.

Note that the working frequency bands could vary both in number and in range, taking into account that the two conditions to be met are:

that the dipole 1 has a bandwidth that allows the reception or transmission of signals on that frequency.

that at least one of the director elements 2 is adapted to each of the frequency bands.

Therefore, and by way of illustration and not limitation, an antenna could be made with two director bars 2 for two different bands (5G at 700 MHz and 4G at 2,600 MHz), an antenna with four director bars for four different bands 2, etc.

Figure 3:
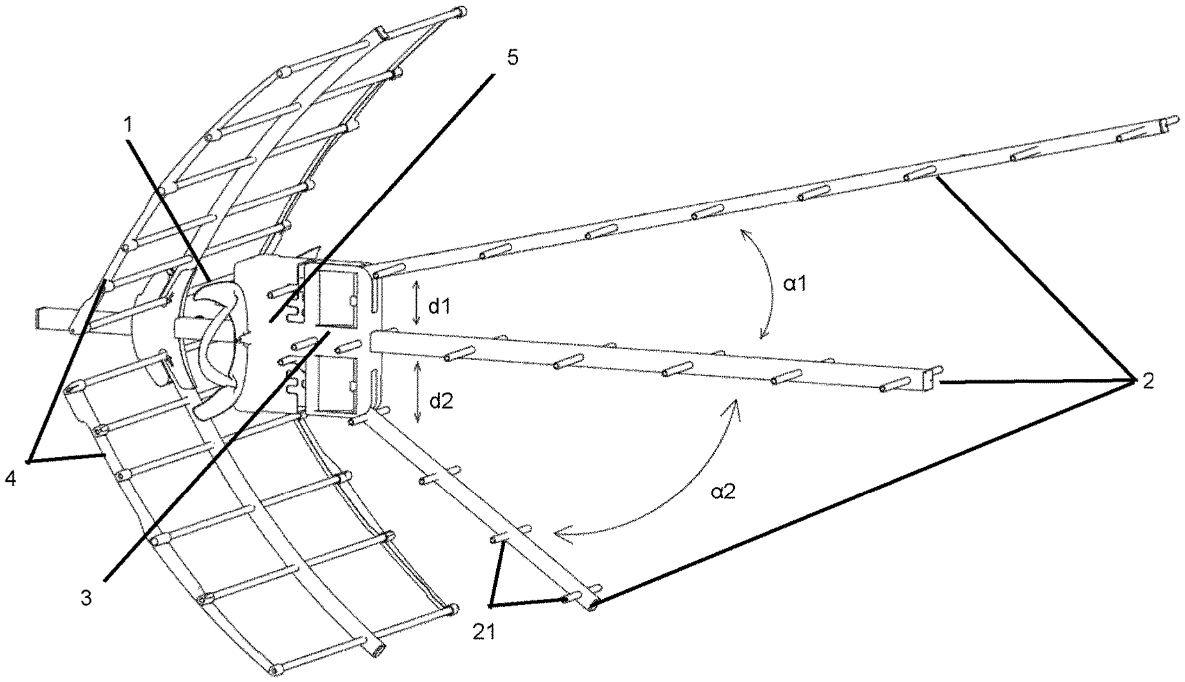
FIG. 3.—Yagi-type multiband antenna with three bars and reflector elements

In this example of FIG. 3, the antenna comprises two reflector elements 4. Said reflector elements could be adapted to two of the different frequency bands of the antenna or both reflectors to the same band, depending on the gain/directivity characteristics desired for the antenna.

Figure 4:
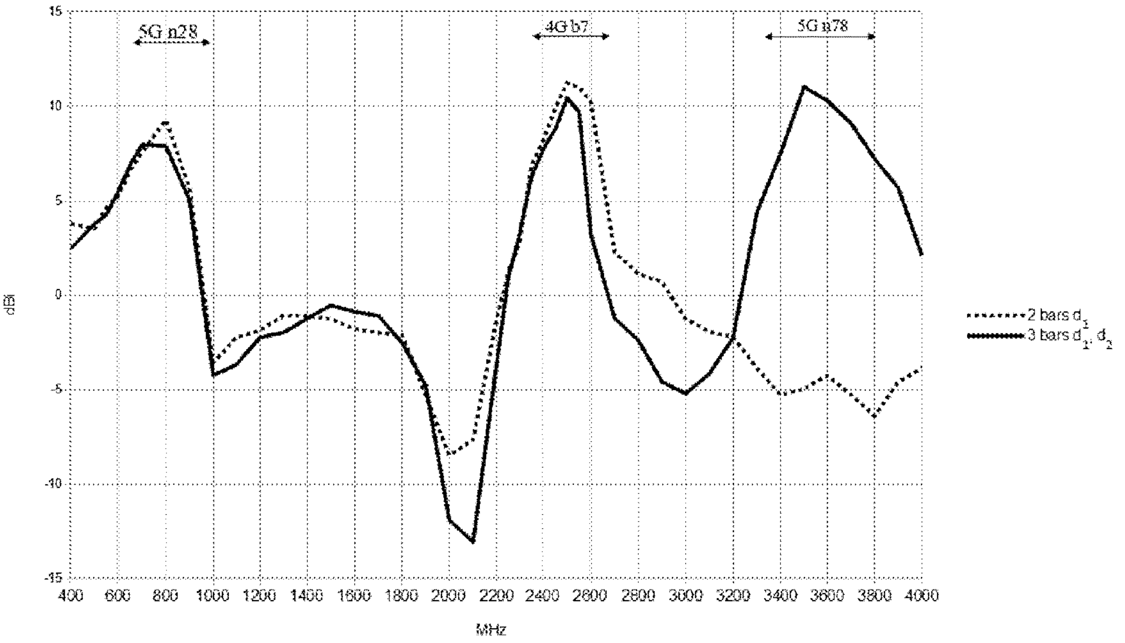
FIG. 4.—Example of frequency response for antennas with 2 or 3 director bars adapted to different frequency bands.

FIG. 4 shows the frequency response of the antenna for cases of using 2 or 3 director bars adapted to different frequencies. In the case of the 2 bars, it can be seen that the presence of each director bar 2 adapted to a frequency band implies an increase in the gain in said band.

Figure 5:
FIG. 5.—Comparative example between the frequency responses of an antenna with two director bars adapted to different frequency bands FIG. 6.—Detail of a possible embodiment of an exchange, positioning and orientation system in the Yagi-type multiband antenna.

In another preferred embodiment of the invention, the antenna could have more than one director bar 2 adapted to the same frequency band, so as to allow increasing the gain in a certain frequency band with respect to another or others of the bands for which the antenna is intended. A comparative example between the frequency responses of an antenna with two director bars 2 adapted to different frequency bands (5G 700 MHz and 4G 2600 MHz) and an antenna with three director bars 2, two of them adapted to the same frequency band (5G 700 MHz) and the remaining adapted to the other frequency band (4G 2600 MHz) is shown in FIG. 5. As can be seen, there is an increase in the gain in the 5G 700 MHz band to which two director bars 2 are adapted.

Likewise, as is well known, the director bars can also have a higher or lower number of director elements (and consequently greater or lesser length) depending on the frequency response that is desired to be given to the antenna, prioritizing the gain in one or more bands over the rest.

On the other hand, the antenna of the preferred embodiment shown in FIG. 3 comprises a system that allows the exchange, positioning and orientation of director bars 2 maintaining the main structure, so that:

one or more director bars 2 can be replaced by others adapted to another or other frequency bands.

different distances $d_1$, $d_2$ can be defined between the bars in the supporting area.

different angles can be defined between bars $\alpha_1$, $\alpha_2$.

Figure 6:
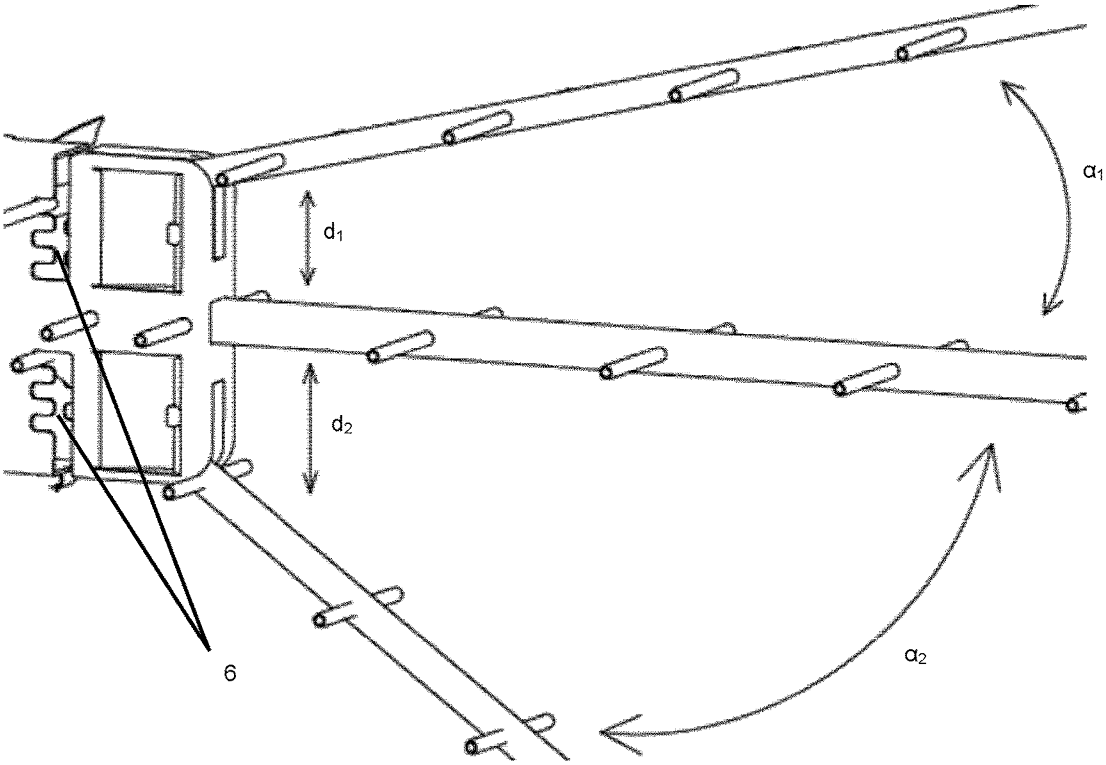

FIG. 6 shows the detail of a possible embodiment of an exchange, positioning and orientation system, based on a rail through which a director of the director bar is inserted and positioned in an area adjacent to the lane according to the distance $d_1$ at which it is desired to position the central bar. After positioning at the desired distance, angle $\alpha_1$ with the bar can be defined by different notches located on the outside part of the support, either with an threaded wheel, internal to the mechanism or any other means known in the state of the art.

The skilled person will clearly deduce that the exchange, positioning and orientation system can be implemented for any of the bars, including the center bar in this case.

In this case, the system is integrated with the antenna connection box, but the person skilled in the art will understand that it is possible to make a separated mechanism from said connection box. This system allows only the insertion/extraction of one or several bars, its positioning defining the distance between the bars $d_1$, $d_2$ or the angle between the bars $\alpha_1$, $\alpha_2$, as well as any combination of all the above.

Another example of a mechanism could be one in which the director bars are press-fitted at one of their ends and which in turn allows their translation and/or rotation.

Figure 7:
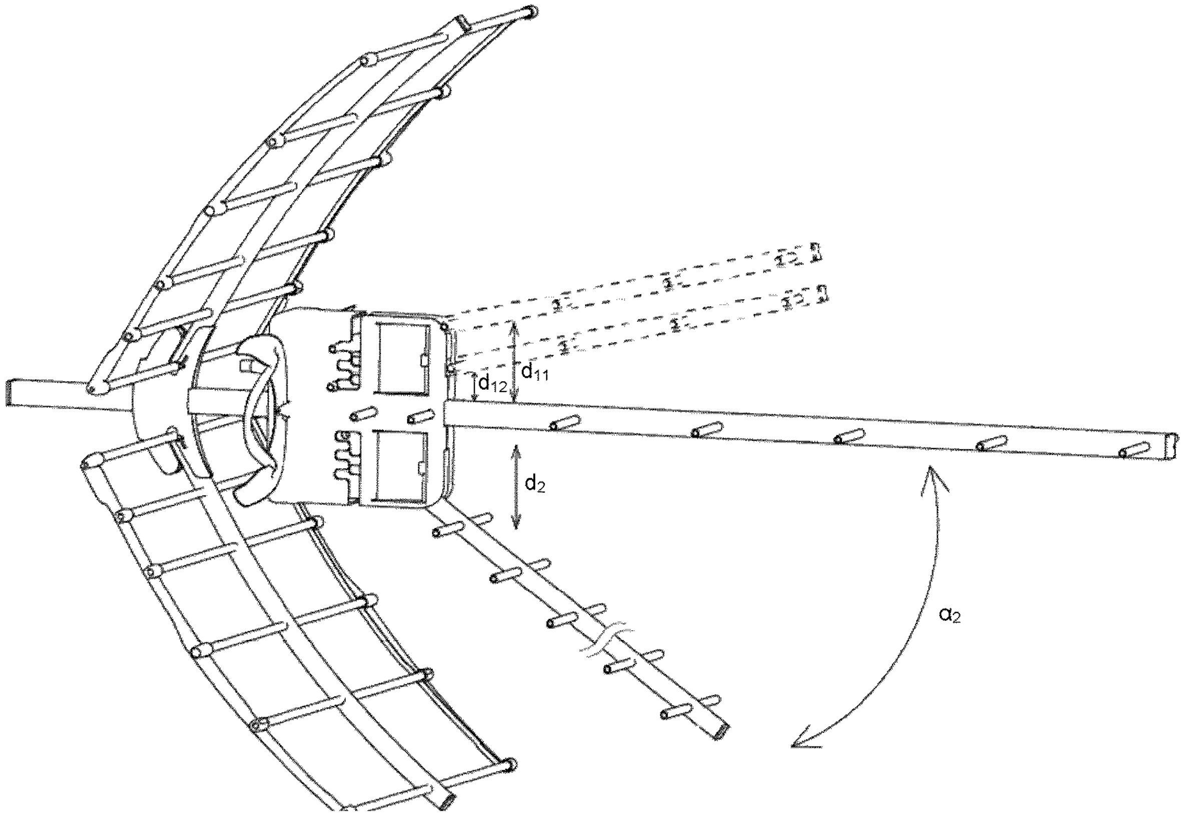
FIG. 7.—Yagi-type multiband antenna with variation of distance d1 between two director bars.

FIG. 7 shows an example of the Yagi-type multiband antenna in which the distance $d_1$ between two director bars is modified. In this case, without the invention being limited thereto, the distance $d_1$ between the upper bar (5G-3,500 MHz) and the central bar (4G-2,600 MHz) is modified.

Figure 8:
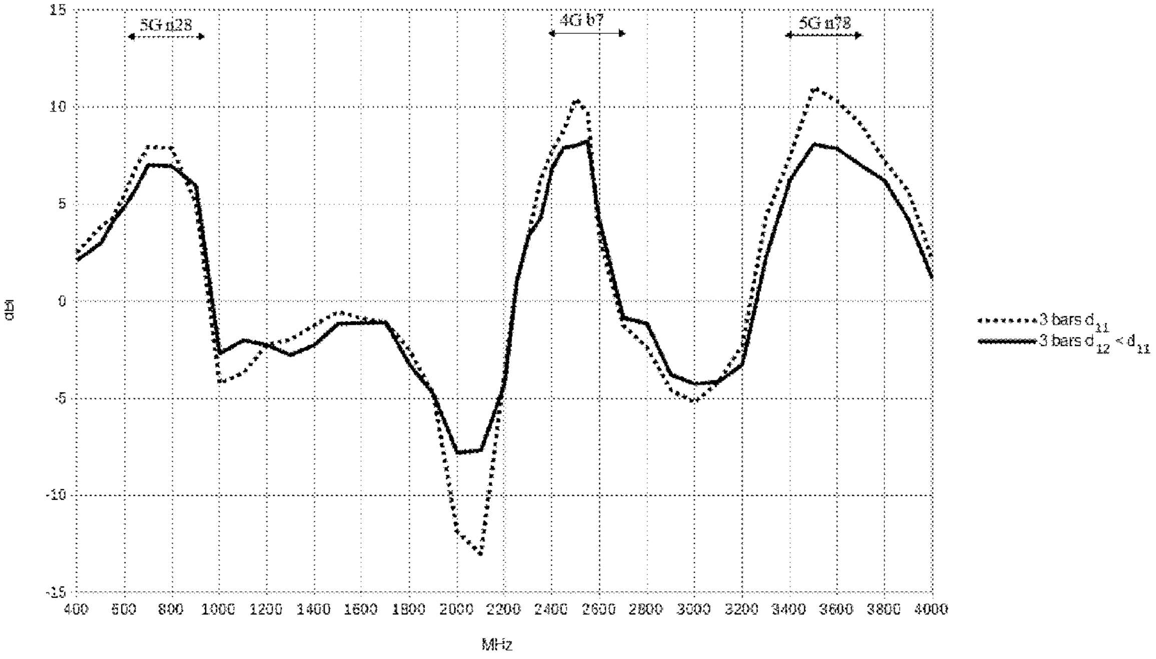
FIG. 8.—Effect of the modification of distance d1 between two director bars on the frequency response of the Yagi-type multiband antenna.

FIG. 8 shows the effect on the frequency response of said modification of the distance $d_1$. In this specific case, a decrease in the distance $d_{11}$ to $d_{12}$ has been considered, displacing the director bar adapted to the highest band (5G-3,500 MHz) with respect to the central bar (4G-2,600 MHz). It can be seen that the gain decreases in all the bands as the distance decreases, the most pronounced effect being on the band of the bar that moves and the effect on the rest of the bands being reduced as the distance of the corresponding bars increases with respect to the bar that moves. Similarly, an increase in the distance between the director bars will mean an increase in the gain in the corresponding frequency bands, although from a certain separation between the bars due to the fact that an excessive distance to the dipole can mean the loss of the coupling effect of the bars on the dipole, which is the operating principle of a Yagi-type antenna.

Figure 9:
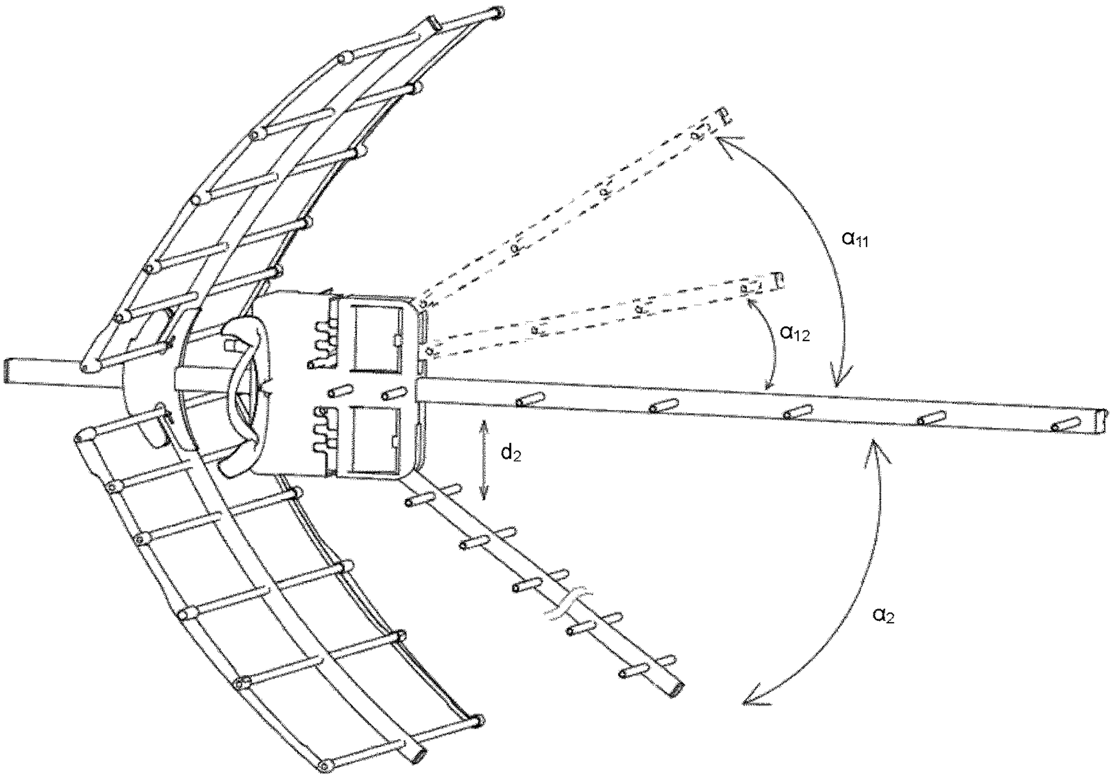
FIG. 9.—Yagi-type multiband antenna with variation of angle $\alpha$1 between two director bars.

FIG. 9 shows an example of the Yagi-type multiband antenna in which angle $\alpha_1$ between two director bars is modified. In this case, without the invention being limited thereto, angle $\alpha_1$ between the upper bar (5G 3,500 MHz) and the center bar (4G-2,600 MHz) is modified.

Figure 10:
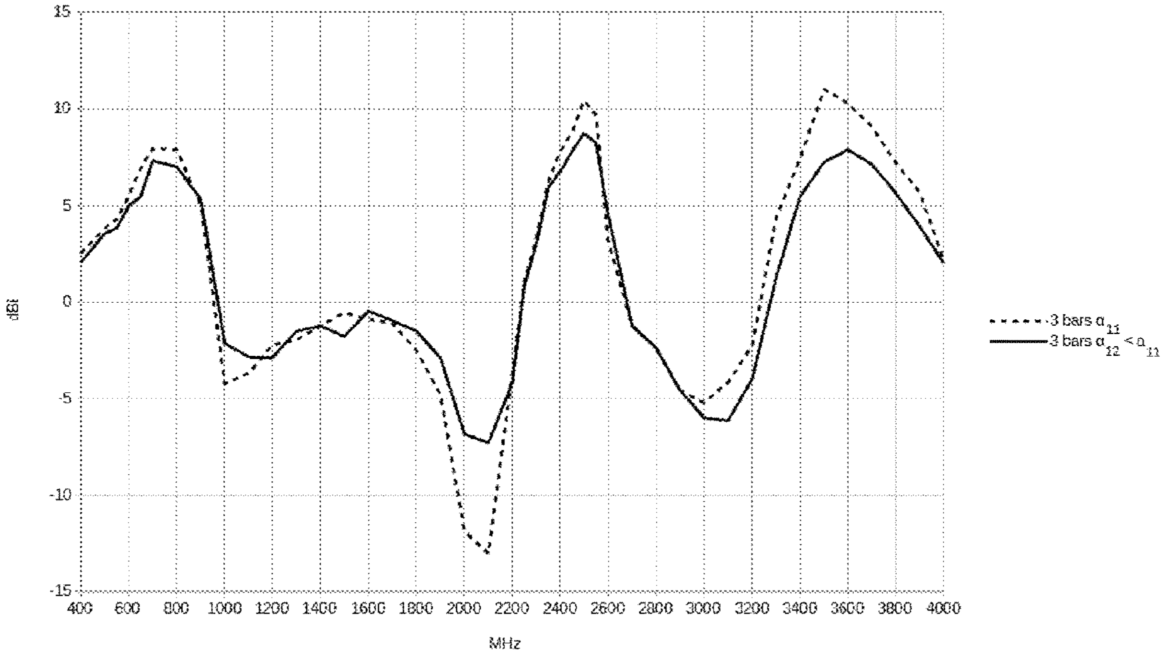
FIG. 10.—Effect of the modification of angle $\alpha$1 between two director bars on the frequency response of the Yagi-type multiband antenna.

FIG. 10 shows the effect on the frequency response of said modification of angle $\alpha_1$. In this specific case, a reduction of angles $\alpha_{11}$ to $\alpha_{12}$ has been considered, rotating the director bar adapted to the highest band (5G 3,500 MHz) with respect to the central bar (4G-2,600 MHz). It can be seen that the gain decreases in all the bands as angle $\alpha_1$ between the bars decreases, the most pronounced effect being on the bar band that rotates and reducing the effect on the rest of the bands as the distance of the corresponding bars increases with respect to the bar that rotates. Similarly, an increase in the angle between the director bars will mean an increase in the gain in the corresponding frequency bands, although there will be a limit angle between the bars because an excessive angle can cause the main radiation lobe of the antenna at that frequency to no longer be pointing in the desired direction, and therefore the gain of the antenna in said direction of reception or transmission is reduced.

Figure 11:
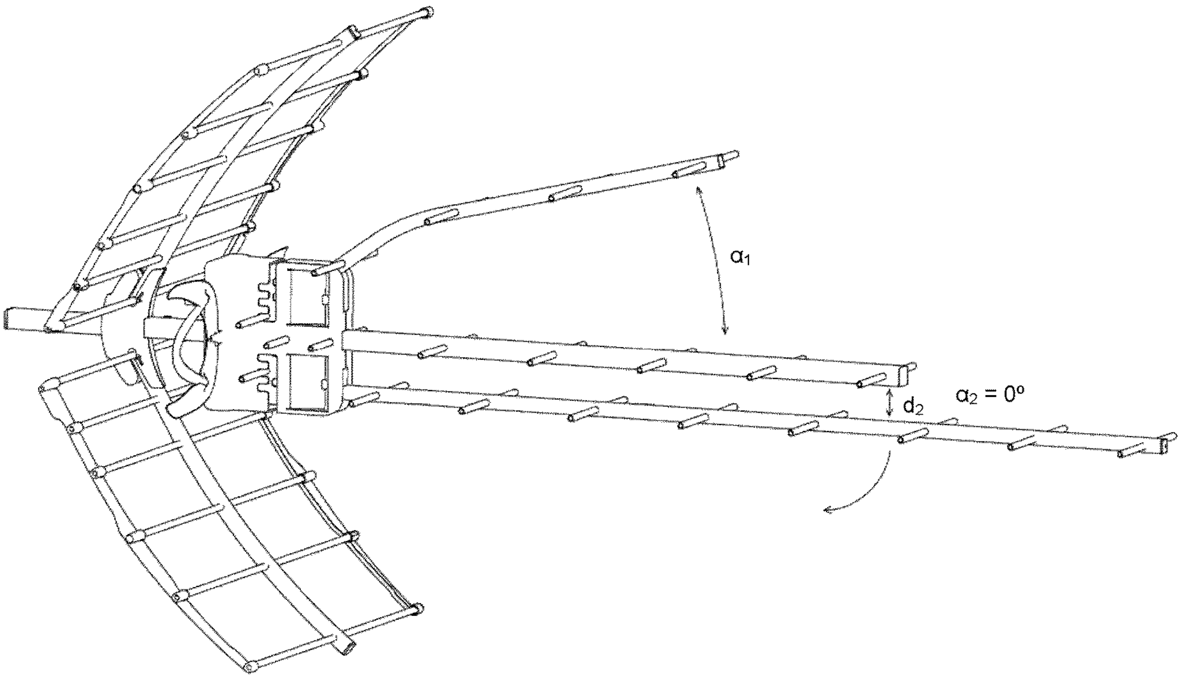
FIG. 11.—Yagi-type multiband antenna with two parallel director bars ($\alpha$2=0)

Similarly, the modifications in both distance and angle between the director bars could be applied to any spacing $d_1$, $d_2$, . . . , $d_{n-1}$ and angle $\alpha n$ between bars, both of which can be applied simultaneously in order to achieve a frequency response appropriate to the specific application for which the antenna is designed. FIG. 11 shows a case where two of the director bars 2 are parallel.

Figure 12:
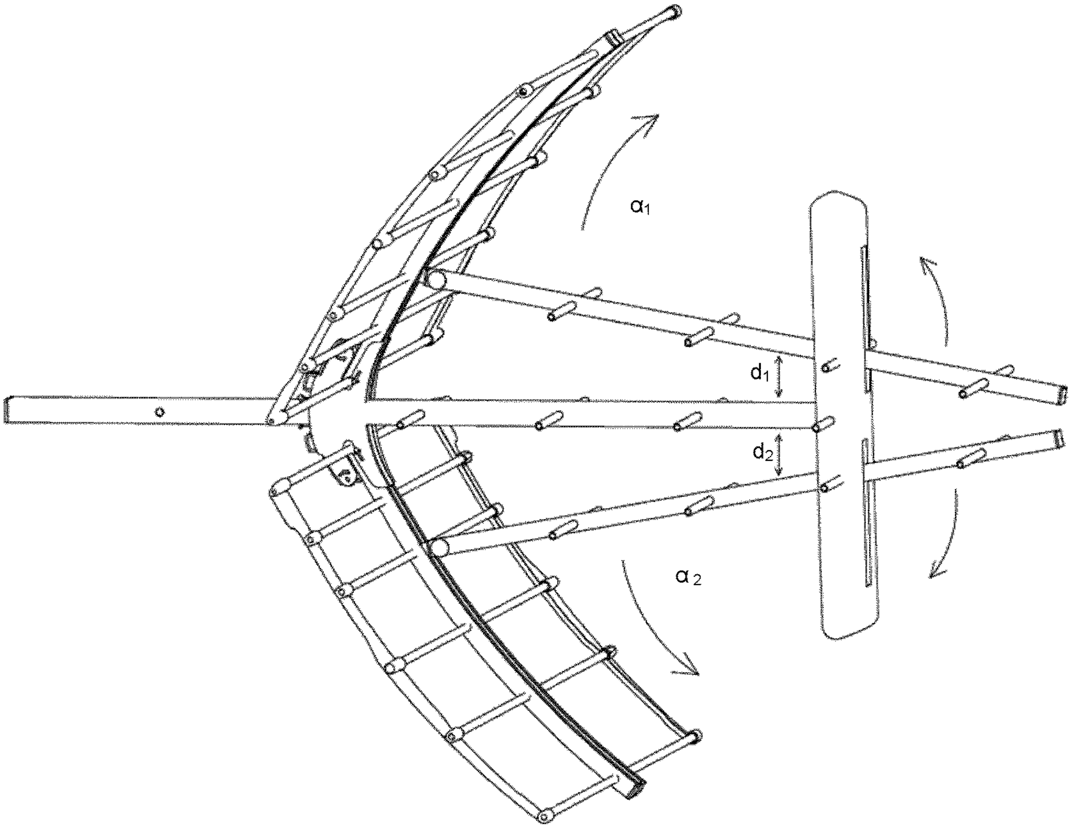
FIG. 12.—Yagi-type multiband antenna with an exchange and/or positioning and/or orientation system attached to the reflectors.

FIG. 12 shows another preferred embodiment, in which the antenna comprises an exchange and/or positioning and/or orientation system formed distributed in two elements, one of them attached to the reflectors, with an additional central element that provides support to the antenna and the possibility of configuring the distance between the bars and their orientation. This central additional element may not be necessary in the event that the length of the director bars is reduced.

The invention claimed is:

1. A Yagi-type multiband antenna comprising:

a dipole connected to an input/output cable of the antenna, a plurality of n director bars, each of the director bars designed for a frequency band, wherein each director bar includes a number of director elements with lengths ($L_1$, . . . $L_n$) and spaced at distances ($s_1$, $s_2$, . . . , $s_n$) between them, and wherein the frequency band for which each director bar is designed is defined by the number of the director elements, their lengths ($L_1$, . . . $L_n$) and/or the distances ($s_1$, $s_2$, . . . , $s_n$) between them, fastening and supporting means to which the director bars are joined at one of their ends, wherein:

the dipole is designed for a bandwidth comprising the multiband, the director bars are at distances ($d_1$, $d_2$, . . . , $d_{n-1}$) from each other, the director bars form angles ($\alpha_1$, $\alpha_2$, . . . , $\alpha_{n-1}$) with one another characterised in that:

at least two director bars are designed for different frequency bands not overlapping each other included in the bandwidth comprising the multiband.

2. The Yagi-type multiband antenna according to claim 1 characterized by comprising insertion and extraction means for at least one director bar.

3. The Yagi-type multiband antenna according to claim 2 characterized by the insertion and extraction means for at least one director bar are integrated with the fastening and supporting means.

4. The Yagi-type multiband antenna according to claim 2 characterized by comprising an antenna connection box for dipole connection with the output cable, the fastening and supporting means are integrated with the antenna connection box.

5. The Yagi-type multiband antenna according to claim 2 characterized by comprising at least one reflector adapted to one of the frequency bands.

6. The Yagi-type multiband antenna according to claim 5 characterized by comprising two reflectors adapted to different frequency bands.

7. The Yagi-type multiband antenna according to claim 5 characterized by at least one of the insertion and extraction means being attached to a reflector.

8. The Yagi-type multiband antenna according to claim 1 characterized by comprising means to configure the distance ($d_1$, $d_2$, . . . , $d_{n-1}$) and/or the angle ($\alpha_1$, $\alpha_2$, . . . , $\alpha_{n-1}$) between the director bars.

9. The Yagi-type multiband antenna according to claim 1 characterized by comprising at least three director bars, where at least two of the director bars are designed for the same frequency band.

10. The Yagi-type multiband antenna according to claim 1 characterized by including a filter between the dipole and the output cable.

* * * * *